United States Patent
Matthews

[15] 3,665,094
[45] May 23, 1972

[54] FUSE BOXES FOR ROAD VEHICLES

[72] Inventor: Benjamin William Matthews, Small Heath, England

[73] Assignee: Joseph Lucas (Industries) Limited, Birmingham, England

[22] Filed: Nov. 10, 1970

[21] Appl. No.: 88,367

[30] Foreign Application Priority Data

Nov. 21, 1969 Great Britain......................57,036/69

[52] U.S. Cl. ..........................................174/65 R, 337/207
[51] Int. Cl. ......................................................H02g 3/22
[58] Field of Search..............174/65, 65 G, 153 G; 337/186, 337/191, 192, 193, 207, 208, 209; 248/56

[56] References Cited

UNITED STATES PATENTS

| | | | |
|---|---|---|---|
| 2,457,925 | 1/1949 | Salmons et al.......................337/207 X |
| 2,458,670 | 1/1949 | Young et al. ..............................248/56 |
| 2,475,341 | 7/1949 | Steinmayer........................337/191 X |
| 2,659,765 | 11/1953 | Dunn.......................................174/65 |

FOREIGN PATENTS OR APPLICATIONS 621,632 12/1962 Belgium............................174/153 G Primary Examiner—Lewis H. Myers
Assistant Examiner—D. A. Tone
Attorney—Holman & Stern

[57] ABSTRACT

A fuse box comprises a synthetic resin body supporting fuse holders adapted to receive and make electrical connection to leads forming part of a cable harness, a groove being formed in the periphery of the body. The fuse box further includes a bridging member, co-operating latch means of the bridging member and the body adjacent said groove serving to releasably retain the bridging member on the body. The arrangement is such that in use the cable harness is accommodated in the groove and when engaged with the body the bridging member bridges the groove to provide a substantially circular aperture in the body. The harness passes through a grommet and the grommet engages in the aperture in the body to retain the harness in position relative to the body.

3 Claims, 1 Drawing Figure

Patented May 23, 1972
3,665,094
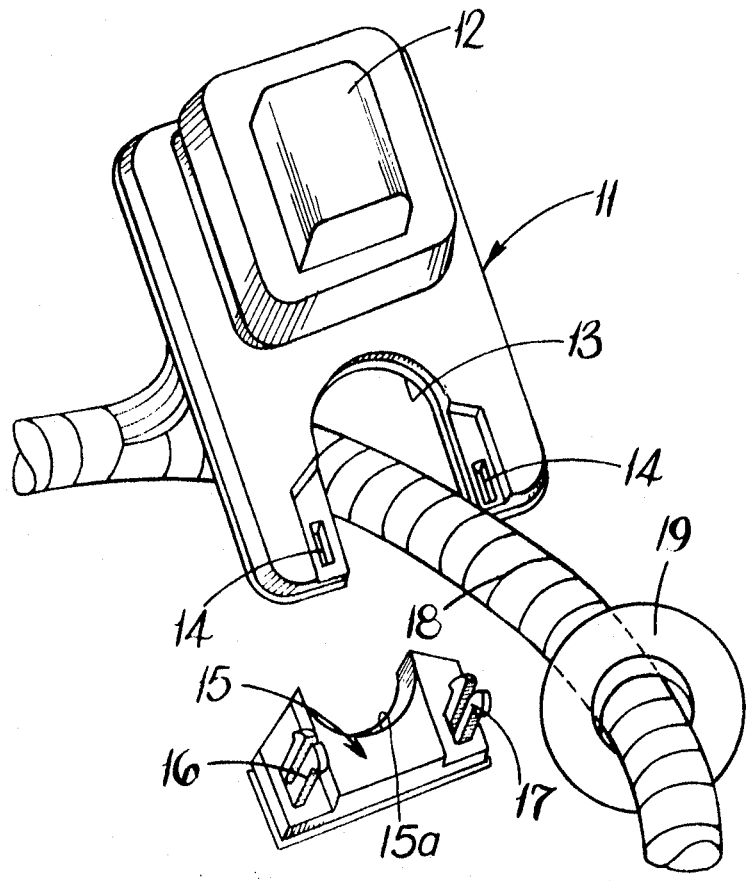
INVENTOR
Benjamin William Matthews
Holman & Stern
ATTORNEYS

FUSE BOXES FOR ROAD VEHICLES

This invention relates to fuse boxes for road vehicles.

A fuse box, according to the invention, comprises a synthetic resin body supporting fuse holders adapted to receive and make electrical connection to leads forming part of a cable harness, a groove in the periphery of said body, a bridging member, co-operating latch means on said bridging member and said body adjacent said groove, said latch means releasably retaining said bridging member on said body, the arrangement being such that in use said cable harness is accommodated in said groove, and when engaged with the body the bridging member bridges said groove to provide a substantially circular aperture in said body, and a grommet through which the harness passes, the grommet engaging in said aperture to retain said harness in position relative to said body.

The accompanying drawing is a perspective view of a fuse box, according to one example of the invention.

Referring to the drawing a fuse box comprises a moulded synthetic resin body 11, having at one end thereof a plurality of fuse holder contacts (not shown) enclosed by a cover 12 engaged with the body 11. The body 11 is further formed with a substantially U-shaped groove 13 extending inwardly from the periphery thereof remote from the cover 12, the curved portion of the groove 13 being substantially semi-circular. The body 11 is also provided with a pair of slots 14 on opposite sides respectively of the groove 13 adjacent the periphery of the body 11.

A moulded synthetic resin bridging member 15 is adapted to engage in the groove 13 in the body 11 adjacent the periphery of the body, the bridging member 15 being formed with a substantially semi-circular, peripheral groove 15a of radius equal to the radius of the circle defining the curved portion of the groove 13. A pair of flexible tabs 16 project from each of a pair of opposite sides of the bridging member 15, each of the tabs being formed with an integral barbed portion 17. The pairs of tabs 16 on the bridging member are pushed into the slots 14 respectively to engage the bridging member 15 with the body 11, the barbed portions 17 serving to prevent accidental removal of the bridging member. However, since the tabs 16 on the bridging member are flexible, the tabs and the slots 14 in the body 11 form co-operating latch means to releasably retain the bridging member in engagement with the body.

To assemble the fuse box on the cable harness 18, the cable harness 18 is positioned in the groove 13 in the body 11 of the fuse box and the required electrical connections are made from the leads in the harness 18 to the appropriate fuse holder contacts. The tabs 16 of the bridging member 15 are then positioned in their respective slots 14 in the body 11 with the barbed portions 17 engaging with the under surface of the body to prevent accidental removal of the bridging member from the body. The arrangement of the grooves 13,15a is such that when engaged with the body 11 the bridging member 15 bridges the groove 13 to define a substantially circular aperture in the assembled fuse box, the diameter of the aperture being such that a rubber grommet 19 carried by the cable harness 18 can be received and engaged in the aperture. The grommet 19 serves to retain the cable harness 18 in position relative to the fuse box and so prevents breakage of any of the electrical connections to the fuse box.

Having thus described my invention what I claim as new and desire to secure by Letters Patent is:

1. A fuse box comprising a synthetic resin body supporting fuse holders adapted to receive and make electrical connection to leads forming part of a cable harness; a groove in the periphery of said body to accommodate said cable harness; a bridging member and co-operating latch means on said bridging member and said body adjacent said groove; said latch means releasably retaining said bridging member in engagement with said body so that the bridging member bridges said groove to provide a substantially circular aperture through said body and which aperture is adapted to receive a grommet through which the cable harness passes so as to retain said cable in position relative to said body.

2. A fuse box as claimed in claim 1 wherein said co-operating latch means includes a pair of flexible tabs projecting from each of a pair of opposite sides of the bridging member, said tabs being engaged in use in respective slots in said body and each being formed with an integral, barbed portion to prevent accidental disengagement of the bridging member from said body in use.

3. A fuse box as claimed in claim 1 wherein said groove in said body is U-shaped, the curved portion of said U-shaped groove being substantially semi-circular, and wherein said bridging member defines a further, substantially semi-circular groove of radius equal to the radius of the curved portion of said first mentioned groove, the grooves being arranged to define said circular aperture in said body when said bridging member is engaged therewith.

* * * * *